United States Patent
Takahashi et al.

(10) Patent No.: US 11,345,826 B2
(45) Date of Patent: May 31, 2022

(54) INKJET PRINTING DEVICE AND INKJET PRINTING METHOD

(71) Applicant: RICOH COMPANY, LTD., Tokyo (JP)

(72) Inventors: Hiroaki Takahashi, Kanagawa (JP); Kiminori Masuda, Tokyo (JP); Mio Akima, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 160 days.

(21) Appl. No.: 16/869,103

(22) Filed: May 7, 2020

(65) Prior Publication Data

US 2020/0354597 A1   Nov. 12, 2020

(30) Foreign Application Priority Data

May 10, 2019 (JP) .............................. JP2019-089788
Mar. 12, 2020 (JP) .............................. JP2020-042693

(51) Int. Cl.
*B41J 2/21* (2006.01)
*C09D 11/08* (2006.01)
(Continued)

(52) U.S. Cl.
CPC ............. *C09D 11/38* (2013.01); *B41J 2/2114* (2013.01); *B41J 11/0024* (2021.01);
(Continued)

(58) Field of Classification Search
CPC ..... B41J 2/2114; B41J 11/0024; C09D 11/38; C09D 11/40; C09D 11/30; C09D 11/033; C08K 3/02
See application file for complete search history.

(56) References Cited

U.S. PATENT DOCUMENTS

2004/0169710 A1* 9/2004 Ide .................. B41J 2/2114
                                                      347/101
2010/0302337 A1* 12/2010 Zhou .................. B41M 7/009
                                                      347/200
(Continued)

FOREIGN PATENT DOCUMENTS

EP       3 246 369 A1    11/2017
JP       2004-261976      9/2004
(Continued)

OTHER PUBLICATIONS

U.S. Appl. No. 16/677,910, filed Nov. 8, 2019, Mio Akima, et al.
(Continued)

*Primary Examiner* — John Zimmermann
(74) *Attorney, Agent, or Firm* — Grüneberg and Meyers PLLC

(57) ABSTRACT

An inkjet printing device includes an ink containing unit to contain a clear aqueous ink containing a resin, a compound represented by the following Chemical formula, and water,

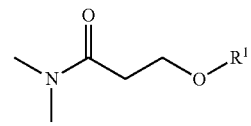

where $R^1$ represents an alkyl group having 1 to 4 carbon atoms, a discharging head to discharge the clear aqueous ink to printed matter to form a layer thereon in a low gloss printing mode or high gloss printing mode, and a heating device to heat the printed matter, wherein the heating device heats the printed matter satisfying the following relationship 1: Tlgloss>Thgloss 1, where Tlgloss represents the temperature of the printed matter at a low gloss printing region in the (Continued)

low gloss printing mode and Thgloss represents the temperature of the printed matter in the high gloss printing mode when the clear aqueous ink is attached to the printed matter.

18 Claims, 2 Drawing Sheets

(51) Int. Cl.
  *C09D 11/322* (2014.01)
  *B41J 11/00* (2006.01)
  *C09D 11/38* (2014.01)
(52) U.S. Cl.
  CPC .... *B41J 11/00214* (2021.01); *B41J 11/00216* (2021.01); *C09D 11/08* (2013.01); *C09D 11/322* (2013.01)

(56) References Cited

U.S. PATENT DOCUMENTS

| 2014/0055511 A1* | 2/2014 | Smith | B41J 2/17593 347/102 |
| 2015/0015639 A1* | 1/2015 | Ito | B41M 7/0018 347/21 |
| 2015/0058783 A1 | 2/2015 | Zhou et al. | |
| 2015/0091973 A1* | 4/2015 | Ikoshi | C09D 11/54 347/21 |
| 2015/0175819 A1* | 6/2015 | Kamada | C09D 11/54 347/21 |
| 2015/0258783 A1* | 9/2015 | Toda | B41J 2/2114 428/207 |
| 2019/0255869 A1* | 8/2019 | Asakawa | C09D 11/322 |
| 2019/0381810 A1 | 12/2019 | Takahashi et al. | |
| 2019/0381811 A1 | 12/2019 | Masuda et al. | |

FOREIGN PATENT DOCUMENTS

| JP | 2010-173287 | 8/2010 |
| JP | 2012-232529 | 11/2012 |
| JP | 2015-003397 | 1/2015 |
| WO | WO 2019/239843 A1 | 12/2019 |
| WO | WO 2020/110403 A1 | 6/2020 |

OTHER PUBLICATIONS

U.S. Appl. No. 16/699,252, filed Nov. 29, 2019, Hiroaki Takahashi, et al.

Extended European Search Report dated Aug. 4, 2020 in European Patent Application No. 20173053.8, 6 pages.

* cited by examiner

INKJET PRINTING DEVICE AND INKJET PRINTING METHOD

CROSS-REFERENCE TO RELATED APPLICATIONS

This patent application is based on and claims priority pursuant to 35 U.S.C. § 119 to Japanese Patent Application Nos. 2019-089788 and 2020-042693, filed on May 10, 2019 and Mar. 12, 2020, respectively, in the Japan Patent Office, the entire disclosures of which are hereby incorporated by reference herein.

BACKGROUND

Technical Field

The present invention relates to an inkjet printing device and an inkjet printing method.

Description of the Related Art

Media such as non-permeable recording media including plastic film are used for advertisements and signboards and packaging material for food, beverages, and daily commodities that require resistance to light, water, abrasion, and the like. Naturally, various inks for such recording media have been developed.

Such inks are widely used and include solvent-based inks using organic solvents as solvents and ultraviolet curing inks containing polymerizable monomers as the main component. However, evaporation of organic solvents contained in the solvent-based inks raises environment concerns. Also, the polymerizable monomers usable in ultraviolet curing inks are limited in some cases because of safety reasons.

For this reason, ink sets including aqueous ink that have a low environmental impact and can be directly applied to non-permeable recording media have been proposed.

SUMMARY

According to embodiments of the present disclosure, provided is an inkjet printing device includes an ink containing unit configured to contain a clear aqueous ink containing a resin, a compound represented by Chemical formula 1, and water

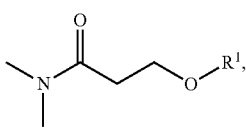

Chemical formula 1 where R1 represents an alkyl group having 1 to 4 carbon atoms, a discharging head configured to discharge the clear aqueous ink to attach the clear aqueous ink to printed matter to form a clear ink layer thereon with low gloss in a low gloss printing mode or high gloss in a high gloss printing mode, and a heating device configured to heat the printed matter, wherein the heating device heats the printed matter satisfying the following relationship 1: Tlgloss>Thgloss 1, where Tlgloss represents the temperature of the printed matter at a low gloss printing region where the clear aqueous ink is attached in the low gloss printing mode when the clear aqueous ink is attached to the printed matter and Thgloss represents the temperature of the printed matter at a high gloss printing region where the clear aqueous ink is attached in the high gloss printing mode when the clear aqueous ink is attached to the printed matter.

As another aspect of embodiments of the present disclosure, provided is an inkjet printing device that includes an ink containing unit configured to contain a clear aqueous ink comprising a resin, a compound represented by Chemical formula 1, and water

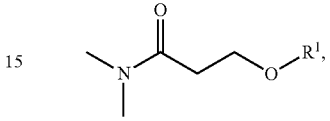

Chemical formula 1 where $R^1$ represents an alkyl group having 1 to 4 carbon atoms, a discharging head configured to discharge the clear aqueous ink to attach the clear aqueous ink to printed matter to form a clear ink layer thereon with low gloss in a low gloss printing mode or high gloss in a high gloss printing mode, and a heating device configured to heat the printed matter, wherein the heating device heats the printed matter satisfying the following relationship 2, HTlgloss>HThgloss 2, where HTlgloss represents a temperature of the heating device in the low gloss printing mode and HThgloss represents a temperature of the heating device in the high gloss printing mode.

As another aspect of embodiments of the present disclosure, provided is an inkjet printing method which includes discharging a clear aqueous ink containing a resin, a compound represented by Chemical formula 1, and water to attach the clear aqueous ink to printed matter to form a clear aqueous ink layer thereon with low gloss in a low gloss printing mode or high gloss in a high gloss printing mode;

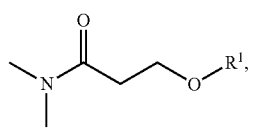

Chemical Formula 1 where $R^1$ represents an alkyl group having 1 to 4 carbon atoms, and heating the printed matter, wherein, in the heating, the printed matter is heated satisfying the following relationship 1: Tlgloss>Thgloss 1, where Tlgloss represents the temperature of the printed matter at a low gloss printing region where the clear aqueous ink is printed in the low gloss printing mode when the clear aqueous ink is attached to the printed matter and Thgloss represents the temperature of the printed matter at a high gloss printing region where the clear aqueous ink is printed in the high gloss printing mode when the clear aqueous ink is attached to the printed matter.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
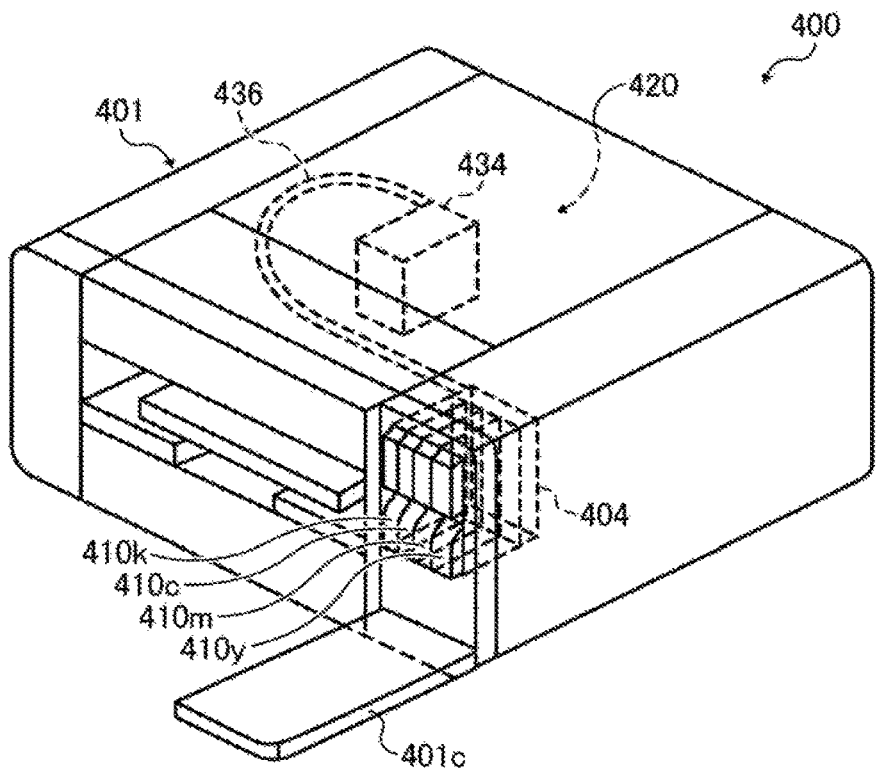
FIG. 1 is a diagram illustrating an example of the image forming device executing the image forming method of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, an inkjet printing device is provided which can apply gloss in two modes of low gloss (matte) and high gloss while reducing occurrence of blocking.

Inkjet recording devices capable of controlling gloss have also been developed. For example, a liquid jetting device has been proposed in JP-2015-3397-A1, which includes a liquid jetting head having nozzles from which ink containing thermoplastic resin particles can be jetted onto a target and a heating device that heats ink droplets that have reached the target. The heating device controls the degree of filming on the surface of the ink droplets by heating them at the filming control temperature corresponding to the minimum film-forming temperature at which the surface of the ink droplets starts filming.

Such inks cause various problems when they do not thoroughly dry. One such problem is blocking. Blocking refers to the partial transfer of a not-thoroughly dry printed image to an item that makes contact with it under pressure, which results in image defects caused, for example, by partial image peeling. Such image defects tend to occur in printing machines that print images on a roll medium and reels them from one roll to another. This occurs, in particular, when a large quantity of ink is present in the image.

Inkjet Printing Device and Inkjet Printing Method

An embodiment of the inkjet printing device according to the present disclosure includes an ink containing unit configured to contain a clear aqueous ink containing a resin, a compound represented by Chemical formula 1, and water,

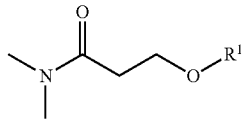

Chemical formula 1 where $R^1$ represents an alkyl group having 1 to 4 carbon atoms, a discharging head configured to discharge the clear aqueous ink to attach it to printed matter to form a clear ink layer thereon with low gloss in a low gloss printing mode or high gloss in a high gloss printing mode and a heating device configured to heat the printed matter, wherein the heating device heats the printed matter satisfying the following relationship 1:

$$Tlgloss > Thgloss \qquad 1.$$

In the relationship 1, Tlgloss represents the temperature of the printed matter at a low gloss printing region where the clear aqueous ink is attached in the low gloss printing mode when the clear aqueous ink is attached to the printed matter and Thgloss represents the temperature of the printed matter at a high gloss printing region where the clear aqueous ink is attached in the high gloss printing mode when the clear aqueous ink is attached to the printed matter. The inkjet printing device may optionally furthermore include other optional devices.

An embodiment of the inkjet printing device according to the present disclosure includes an ink containing unit configured to contain a clear aqueous ink containing a resin, a compound represented by Chemical formula 1, and water,

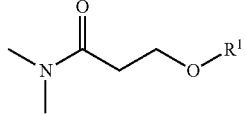

Chemical formula 1 where $R^1$ represents an alkyl group having 1 to 4 carbon atoms, a discharging head configured to discharge the clear aqueous ink to attach it to printed matter to form a clear ink layer thereon with low gloss in a low gloss printing mode or high gloss in a high gloss printing mode and a heating device configured to heat the printed matter, wherein the heating device heats the printed matter satisfying the following relationship 2:

$$HTlgloss > HThgloss \qquad 2.$$

In the relationship 2, HTlgloss represents the temperature of the heating device in the low gloss printing mode and HThgloss represents the temperature of the heating device in the high gloss printing mode. The inkjet printing device may optionally furthermore include other optional devices.

An embodiment of the inkjet printing method of the present disclosure includes discharging a clear aqueous ink includes a resin, a compound represented by Chemical formula 1, and water Chemical formula 1

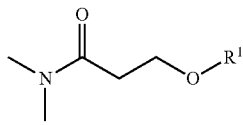

where $R^1$ represents an alkyl group having 1 to 4 carbon atoms, to attach the clear aqueous ink to printed matter to form a clear ink layer thereon with low gloss in a low gloss printing mode or high gloss in a high gloss printing mode and heating the printed matter, wherein, in the heating, the printed matter is heated satisfying the following relationship 1:

$$Tlgloss > Thgloss \qquad 1$$

In the relationship 1, Tlgloss represents the temperature of the printed matter at a low gloss printing region where the clear aqueous ink is attached in the low gloss printing mode when the clear aqueous ink is attached to the printed matter and Thgloss represents the temperature of the printed matter at a high gloss printing region where the clear aqueous ink is printed in the high gloss printing mode when the clear aqueous ink is attached to the printed matter. The inkjet printing method may optionally furthermore include other steps.

An embodiment of the inkjet printing method of the present disclosure includes discharging a clear aqueous ink includes a resin, a compound represented by Chemical formula 1, and water, Chemical formula 1

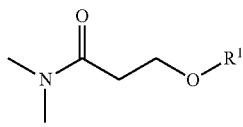

where $R^1$ represents an alkyl group having 1 to 4 carbon atoms to attach the clear aqueous ink to printed matter to form a clear ink layer thereon with low gloss in a low gloss printing mode or high gloss in a high gloss printing mode and heating the printed matter, wherein, in the heating, the printed matter is heated satisfying the following relationship 2:

$$HTlgloss > HThgloss \qquad 2.$$

In the relationship 2, HTlgloss represents the temperature of the heating device in the low gloss printing mode and HThgloss represents the temperature of the heating device in the high gloss printing mode. The inkjet printing method may optionally furthermore include other steps.

When the clear aqueous ink is applied in the high gloss printing mode, the surface of the printed matter is smooth with high gloss. When the clear aqueous ink is applied in the low gloss printing mode, the surface of the printed matter has fine roughness with low gloss. The high gloss printing mode is also referred to as gloss printing mode. The low gloss printing mode is also referred to as matte printing mode.

The method of controlling the degree of gloss by controlling the quantity of irradiation has been proposed to impart low gloss or high gloss by an inkjet recording device using clear ink (UV-curable ink) cured upon irradiation of ultraviolet rays.

However, UV clear ink has a problem of strong odor that remains on printed matter. Therefore, it is not suitable for indoor use. For this reason, the inkjet printing device is required to be placed in an environment with ventilation. In addition, UV clear ink requires an ultraviolet irradiator, which invites size and cost increase.

The present disclosure was formulated based on the knowledge that although the technology disclosed in JP-2015-3397-A1 controls gloss by the degree of filming of the surface of ink droplets of color ink containing a coloring material by heating with a heating device at the filming control temperature corresponding to the minimal filming temperature at which the filming of the surface of the ink droplet initiates, it provides a difference smaller than a clear ink containing no coloring material so that the technology fails to support gloss control of both low gloss and high gloss.

The inkjet printing device and the inkjet printing method of the present disclosure control both low gloss and high gloss by controlling the heating temperature using a clear aqueous ink that contains a resin, the compound represented by the Chemical formula 1 illustrated above, and water. The temperature at which low gloss is imparted during printing is higher than the temperature at which high gloss is imparted. The dots of the clear aqueous ink containing the resin minimally spread because the temperature during printing is high so that the dots adjacent to each other do not easily unified and the height of the dot spheres formed is high. These dots form a rough surface, resulting in manufacturing printed matter with low gloss.

To impart high gloss to printed matter, the clear aqueous ink is attached at temperatures lower than the temperature at which low gloss is imparted. The dots of the clear aqueous ink containing the resin widely spread and unification of the dots adjacent to each other are accelerated because the temperature during printing is low so that the surface of printed matter becomes smooth, thereby providing printed matter with high gloss.

Therefore, the inkjet printing device of the present disclosure uses a clear aqueous ink that contains a resin, the compound represented by Chemical formula 1 illustrated above, and water and has a low gloss printing mode in which low gloss is imparted and a high gloss printing mode in which high gloss is imparted and the heating device heats the printed matter satisfying the following relationship 1 or the relationship 2:

$$Tlgloss > Thgloss \qquad 1.$$

In the relationship 1, Tlgloss represents the temperature of the printed matter at a low gloss printing region where the clear aqueous ink is attached in the low gloss printing mode when the clear aqueous ink is attached to the printed matter and Thgloss represents the temperature of the printed matter at a high gloss printing region where the clear aqueous ink is attached in the high gloss printing mode when the clear aqueous ink is attached to the printed matter;

$$HTlgloss > HThgloss \qquad 2$$

In the relationship 2, HTlgloss represents the temperature of the heating device in the low gloss printing mode and HThgloss represents the temperature of the heating device in the high gloss printing mode. As a result, the inkjet printing device supports both low gloss printing and high gloss printing.

The heating device of the inkjet printing device of the present disclosure heats the printed matter satisfying Tlgloss>Thgloss, preferably Tlgloss−Thgloss≥10 degrees C., and more preferably Tlgloss−Thgloss≥20 degrees C. The temperature HT (degrees C.) of the heating device satisfies HTlgloss>Hthgloss, preferably HTlgloss>Hthgloss≥10 degrees C., and more preferably HTlgloss>Hthgloss≥20 degrees C., where HTlgloss represents the temperature of the heating device in the low gloss printing mode and HThgloss represents the temperature of the heating device in the high gloss printing mode.

The temperature of the heating device in the low gloss printing mode is high to prevent dots from spreading so that the dots have high pile heights, thereby forming a rough surface. On the other hand, the temperature of the heating device in the high gloss printing mode is low so that dots quickly spread and are unified, thereby forming a smooth surface.

The temperature HT (degrees C.) of the heating device is not particularly limited and can be suitably selected to suit to a particular application. The temperature set for the heating device is defined as the temperature HT (degrees C.).

The temperature Tlgloss (degrees C.) of the printed matter of the printing region in the low gloss printing mode is preferably 50 or higher degrees C. and more preferably from 50 to 80 degrees C.

The temperature Thgloss (degrees C.) of the printed matter of the printing region in the high gloss printing mode is preferably 70 or lower degrees C. and more preferably 60 or lower degrees C.

The temperature HTlgloss (degrees C.) of the heating device in the low gloss printing mode is preferably 50 or higher degrees C. and more preferably from 50 to 80 degrees C. The temperature HThgloss (degrees C.) of the printed matter in the high gloss printing mode is preferably 70 or lower degrees C. and more preferably 60 or lower degrees C.

In such temperature ranges, a large gloss difference can be obtained in each printing mode using the clear aqueous ink.

The temperature of the printed matter in the printing region can be measured by methods such as a method of directly measuring the temperature of the recording medium as the printed matter with a thermocouple provided to the recording medium, a method of measuring the temperature of the heater that heats the recording medium and defining it as the temperature of the recording medium, and a method of measuring the ambient temperature of the recording medium in a non-contacting manner by a radiation thermometer and defining it as the temperature of the recording medium.

In the present disclosure, it is preferable to satisfy the following relationship: Dhgloss>Dlgloss and more preferably Dhgloss−Dlgloss>10 percent, where Dlgloss represents the printing ratio of the low gloss printing image printed in the low gloss printing mode and Dhgloss represents the printing ratio of the high gloss printing image printed in the high gloss printing mode.

A smooth surface tends to be formed when the printing ratio is high. Therefore, a high printing ratio is selected for the high gloss printing mode. On the other hand, when the printing ratio is high in the low gloss printing mode, dots adjacent to each other are unified, which makes it difficult to form a rough surface. Therefore, the low gloss printing mode is selected for an image with a low printing ratio.

The printing ratio is represented by the following.

Printing Ratio (percent)={(number of printed dots of clear ink)/(longitudinal resolution×latitudinal resolution)}×100

The number of printed dots of clear ink means the number of dots of clear ink actually printed per unit of area and longitudinal resolution and latitudinal each resolution represent resolutions per unit of area. When the clear ink is overlapped on the same dot position, the number of printed dots of clear ink means the number of dots of clear ink actually printed per unit of area.

The printing ratio of 100 percent means the maximum mass of single color ink to a pixel.

Ink Containing Unit

The ink containing unit contains the clear aqueous ink.

The ink containing unit is not particularly limited as long as it can contain ink and a member such as an ink container and ink tank can be used as the ink containing unit.

The ink container contains the ink and may include other optional suitably-selected members.

There is no specific limit to the ink container. It is possible to select any form, any structure, any size, and any material and use a container having at least an ink bag formed of a material such as aluminum laminate film and a resin film.

The ink tank includes a main tank and a sub-tank.

Discharging Head

The discharging head discharges the clear aqueous ink to form a printing layer.

The discharging head includes a nozzle plate, a pressurizing chamber, and a stimulus generating device.

Nozzle Plate

The nozzle plate has a nozzle substrate and an ink repellent film on the nozzle substrate.

Pressurizing Chamber

The pressurizing chamber is disposed corresponding to individual nozzles provided to the nozzle plate and also serves as a plurality of flow paths communicating with the nozzles. It is also referred to as an ink flow path, a pressurizing liquid chamber, a pressure chamber, a discharging chamber, or a liquid chamber.

Stimulus Generating Device

The stimulus generating device generates a stimulus that is applied to ink.

The stimulus applied by the stimulus generating device is not particularly limited and can be suitably selected to a particular application. Examples include, but are not limited to, heat (temperature), pressure, vibration, and light. These can be used alone or in combination. Of these, heat and pressure are preferable.

Examples of the stimulus generating device include, but are not limited to, a heater, a pressurizing device, a piezoelectric element, a vibrator, an ultrasonic oscillator, and light. Specific examples include, but are not limited to, a piezoelectric actuator such as the piezoelectric element, a thermal actuator that utilizes a phase change caused by film boiling of ink using an electric heat conversion element such as a heat generating resistance, a shape-memory alloy actuator that uses the metal phase change due to temperature change, and an electrostatic actuator that utilizes an electrostatic force.

When the stimulus is heat, a thermal energy is applied to ink in the ink discharging head in response to recording signals by a device such as a thermal head. Bubbles are generated in the ink due to the thermal energy and the ink is discharged as liquid droplets from the nozzles by the pressure of the bubbles.

When the stimulus is pressure, a voltage is applied to the piezoelectric element attached at the position referred to as the pressure chamber disposed in the ink flow path in the ink discharging head so that the piezoelectric element bends. As a result, the pressure chamber shrinks, so that the ink is discharged from the nozzle of the ink discharging head.

Of these, the method of discharging the ink by utilizing the piezoelectric element to which a voltage is applied is preferable.

Heating Device

The heating device heats the printed matter.

The heating device dries the printing surface and the rear side of the recording medium as printed matter by heating and examples include, but are not limited to, an infrared heater, a heated wind heater, and a heating roller. These can be used alone or in combination.

The method of drying the recording medium as printed matter is not particularly limited and can be suitably selected to suit to a particular application. Examples include, but are not limited to, a method of bringing a heated fluid such as heated wind as a drying medium into contact with the recording medium to which the ink is applied, a method of drying the recording medium with heat transferred by bringing the heating member into contact with the recording medium to which the ink is applied, and a method of heating the recording medium to which the ink is applied by irradiating it with energy rays such as infra red and far infrared.

The recording medium can be heated before, during, or after printing.

When the recording medium is heated before or during printing, the ink is applied to the recording medium already heated. When the recording medium is heated after printing, a printed product can be dried.

The heating time is not particularly limited as long as the temperature of the surface of the recording medium can be desirably controlled and can be suitably set to suit to a particular application It is preferable to control the time length of heating by controlling conveyance speed of the recording medium as printed matter and a printed product.

Ink

The ink includes a clear aqueous ink that contains a resin, the compound represented by the following Chemical formula 1, and water.

The color ink that contains a resin, a coloring material, and water can be also used as the ink. The component for use in the color ink other than the coloring material may be the same as those for use in the clear aqueous ink.

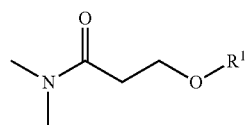

Chemical formula 1

In Chemical formula 1, $R^1$ represents an alkyl group having 1 to 4 carbon atoms.

Compound Represented by Chemical Formula 1

The clear aqueous ink contains the compound represented by Chemical formula 1. Inclusion of the compound represented by Chemical formula 1 improves drying properties of the clear aqueous ink and reduces occurrence of blocking. The compound represented by Chemical formula 1 in the clear aqueous ink is not particularly limited and can be suitably selected to suit to a particular application. The proportion of the compound of the clear aqueous ink is four or greater percent by mass in terms of enhancing drying property. The proportion is preferably from 4 to 90 percent by mass in terms of further enhancing drying property and storage stability of the clear aqueous ink. In addition, the proportion is preferably from 4 to 50 percent by mass so that the gloss degree is suitably controlled.

In Chemical formula 1, specific example of $R^1$ include, but are not limited to, a methyl group, ethyl group, propyl group, and n-butyl group. Of these, 3-methoxy-N,N-dimethyl propioneamide is particularly preferable when $R^1$ is a methyl group.

It is possible to use products suitably synthesized or products available on the market as the compound represented by the Chemical formula 1.

Specific examples of the marketed product include, but are not limited to, Equamide™ M100 (manufactured by Idemitsu Kosan Co., Ltd.) where $R^1$ is a methyl group and Equamide™ B100 (manufactured by Idemitsu Kosan Co., Ltd.) where $R^1$ is a n-butyl group The clear ink is colorless and transparent substantially containing no coloring material. "Substantially containing no coloring material" means that the proportion of the coloring material of the clear ink is 0.5 or less percent by mass and the clear ink may contain impurities and others.

The clear aqueous ink contains water as solvent and may further optionally contain an organic solvent.

The clear aqueous ink contains the compound represented by Chemical formula 1, water, resin and other optional components.

Water

There is no specific limitation to the water and it can be suitably selected to suit to a particular application. For example, deionized water, ultrafiltered water, reverse osmosis water, pure water such as distilled water, and ultra pure water are suitable. These can be used alone or in combination.

The proportion of the water is preferably from 15 to 60 percent by mass of the total content of the clear aqueous ink. When the proportion is 15 or greater percent by mass, the clear ink can be prevented from being thickened, thereby enhancing discharging stability. When the proportion is 60 or less percent by mass, wettability to a non-permeable recording medium is enhanced, thereby enhancing image quality.

Resin

The resin is not particularly limited and can be suitably selected to suit to a particular application.

Specific examples include, but are not limited to, polyurethane resins, polyester resins, acrylic resins, vinyl acetate-based resins, styrene resins, butadiene resins, styrene-butadiene resins, vinylchloride resins, acrylic styrene resins, and acrylic silicone resins.

It is preferable to add resin particles made of these resins when the ink is manufactured. The resin particle can be added to the ink in a form of a resin emulsion in which the resin particle is dispersed in water as a solvent. It is possible to use resin particles suitably synthesized as the resin particles. Alternatively, they are available on the market. These can be used alone or in combination. Of these, polyurethane resins are preferable. When a polyurethane resin is present in an ink film formed using the clear ink, the film itself becomes tough. This is preferable because it is possible to prevent the inside of the film from being broken and partially peeled or the surface state of the film from changing, thereby changing the color of abraded portions.

Polyurethane Resin

Examples of the polyurethane resin include, but are not limited to, polyether-based polyurethane resins, polycarbonate-based polyurethane resins, and polyester-based polyurethane resins.

The polyurethane resin is not particularly limited and can be suitably selected to suit to a particular application. An example is a polyurethane resin produced by reaction between polyol and polyisocyanate.

Polyol

Examples of the polyol include, but are not limited to, polyether polyols, polycarbonate polyols, and polyester polyols. These can be used alone or in combination.

Polyether Polyol

An example of the polyether polyol can be obtained by subjecting at least one compound having two or more active hydrogen atoms as a starting material to addition polymerization with alkyl ene oxide.

Specific examples of the compound having two or more active hydrogen atoms include, but are not limited to, ethylene glycol, diethylene glycol, triethylene glycol, propylene glycol, trimethylene glycol, 1,3-butanediol, 1,4-butanediol, 1,6-hexane diol, glycerin, trimethylolethane, and trimethylol propane. These can be used alone or in combination.

Specific examples of the alkylene oxide include, but are not limited to, ethylene oxide, propylene oxide, butylene oxide, styrene oxide, epichlorohydrin, and tetrahydrofuran. These can be used alone or in combination.

The polyether polyol is not particularly limited and can be suitably selected to suit to a particular application. Polyoxytetra methylene glycol and polyoxypropylene glycol are preferable to obtain a binder for ink that can impart extremely excellent abrasion resistance.

These can be used alone or in combination.

Polycarbonate Polyol Examples of the polycarbonate polyol that can be used in the production of the polyurethane resin include, but are not limited to, a product obtained by reacting a carboxylic acid ester with a polyol or a product obtained by allowing to react phosgene with bisphenol A.

These can be used alone or in combination.

Specific examples of the carboxylic acid include, but are not limited to, methyl carbonate, dimethyl carbonate, ethyl carbonate, diethyl carbonate, cyclocarbonate, an diphenyl carbonate. These can be used alone or in combination.

Specific examples of the polyol include, but are not limited to, relatively low molecular weight dihydroxy compounds such as ethylene glycol, diethylene glycol, triethylene glycol, 1,2-propylene glycol, 1,3-propylene glycol, dipropylene glycol, 1,4-butane diol, 1,3-butane diol, 1,2-butane diol, 2,3-butane diol, 1,5-pentane diol, 1,5-hexane diol, 2,5-hexane diol, 1,6-hexane diol, 1,7-heptane diol, 1,8-octane diol, 1,9-nonane diol, 1,10-decane diol, 1,11-undecane diol, 1,12-dodecane diol, 1,4-cyclohexane diol, 1,4-cyclohexane dimethanol, hydroquinone, resorcin, bisphenol-A, bisphenol-F, and 4,4'-biphenol, polyether polyols such as polyethylene glycol, polypropylene glycol, and polyoxytetramethylene glycol, and polyester polyols such as polyhexamethylene adipate, polyhexamethylene succinate, and polycaprolactone. These can be used alone or in combination.

Polyester Polyol

Specific examples of the polyester polyol include, but are not limited to, a product obtained by esterification reaction between a low molecular weight polyol and a polycarboxylic acid, a polyester obtained by a ring-opening polymerization reaction of a cyclic ester compound such as ε-caprolactone, and a copolymerized polyester. These can be used alone or in combination.

Specific examples of the low molecular weight polyol include, but are not limited to, ethylene glycol and propylene glycol. These can be used alone or in combination.

Specific examples of the polycarboxylic acid include, but are not limited to, succinic acid, adipic acid, sebacic acid, dodecane dicarboxylic acid, terephthalic acid, isophthalic acid, phthalic acid, and anhydrides or ester forming derivatives thereof. These can be used alone or in combination.

Polyisocyanate

Specific examples of the polyisocyanate include, but are not limited to, aromatic diisocyanates such as phenylene diisocyanate, tolylene diisocyanate, diphenylmethane diisocyanate, and naphthalene diisocyanate, and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene isocyanate, and 2,2,4-trimethylhexamethylene diisocyanate. These can be used alone or in combination. Of these, alicyclic diisocyanates are preferable in terms of weatherability.

Furthermore, it is preferable to add at least one type of alicyclic diisocyanates, thereby easily imparting a desired film toughness and abrasion resistance.

Specific examples of the alicyclic diisocyanate include, but are not limited to, isophorone diisocyanate and dicyclohexylmethane diisocyanate.

The proportion of the alicyclic diisocyanate is preferably 60 or greater percent by mass of the total content of the isocyanate compound.

Method of Manufacturing Polyurethane Resin

The polyurethane resin can be manufactured by existing manufacturing methods without a particular limitation. The following method is suitably used.

First, an isocyanate-terminated urethane prepolymer is prepared in the presence of an organic solvent or the absence of a solvent by the reaction of the polyol and the polyisocyanate with an equivalent ratio in which isocyanate groups are excessive.

Next, optionally the anionic group in the isocyanate-terminated urethane prepolymer is neutralized by a neutralizer. Subsequent to reaction with a chain elongating agent, the system is optionally purged of the organic solvent to obtain the urethane resin.

Specific examples of the organic solvent usable for the production of the polyurethane resin include, but are not limited to, ketones such as acetone and methylethyl ketone, ethers such as tetrahydrofuran and dioxane, acetic acid esters such as ethyl acetate and butyl acetate, nitriles such as acetonitrile, and amides such as dimethyl formamide, N-methyl pyrrolidone, and N-ethyl pyrrolidone. These can be used alone or in combination.

Polyamines or other compounds containing an active hydrogen group can be used as the chain elongating agent.

Specific examples of the polyamine include, but are not limited to, diamines such as ethylene diamine, 1,2-propane diamine, 1,6-hexamethylene diamine, piperazine, 2,5-dimethyl piperazine, isphorone diamine, 4,4'-dicyclohexyl methane diamine, and 1,4-cyclohexane diamine, polyamines such as diethylene triamine, dipropylene triamine, and triethylene tetramine, hydrazines, hydradines such as N,N' dimethyl hydrazine and 1,6-hexamethylene bis hydrazine, and dihydrazides such as succinic dihydrazide, adipic acid dihydrazide, glutaric acid dihydrazide, sebacic acid dihydrazide, and isophthalic acid dihydrazide. These can be used alone or in combination.

Specific examples of the other compounds having active hydrogen groups include, but are not limited to, glycols such as ethylene glycol, diethylene glycol, triethylene glycol, propylene glycol, 1,3-propane diol, 1,3-butane diol, 1,4-butane diol, hexamethylene glycol, saccharose, methylene glycol, glycerin, and sorbitol, phenols such as bisphenol A, 4,4'-di hydroxydi phenyl, 4,4'-di hydroxydi phenyl ether, 4,4'-di hydroxydi phenyl sulfone, hydrogenated bisphenol A, and hydroquinone, and water. These can be used alone or in combination unless the storage stability of the ink is degraded.

As the polyurethane resin, polycarbonate-based polyurethane resins are preferable in terms of water resistance, heat resistance, abrasion resistance, weather resistance, and friction resistance of an image due to high agglomeration power of carbonate groups. When the ink contains a polycarbonate-based polyurethane resin, it is suitable for recorded matter for use in severe conditions like outdoor use.

The polyurethane resin is available on the market. Specific examples include, but are not limited to, UCOAT UX-485 (polycarbonate-based polyurethane resin), UCOAT UWS-145 (polyester-based polyurethane resin), PERMARIN US-368T (polycarbonate-based polyurethane resin), and PERMARIN UA-200 (polyether-based polyurethane resin) (all manufactured by Sanyo Chemical Industries, Ltd.). These can be used alone or in combination.

The proportion of the resin of the clear ink is preferably eight or greater percent by mass and more preferably from 8 to 25 percent by mass. When the proportion of the resin is eight or greater percent by mass, low gloss and high gloss can be controlled with a small amount of clear ink. Conversely, when the proportion of the resin surpasses 25 percent by mass, discharging stability of the ink may deteriorate.

The dots of the surface of printed matter with low gloss form isolated spherical dots having a high height, thereby forming a rough surface (matte).

When the proportion of the resin of the clear ink is large, dots having a high pile height are easily formed so that printed matter with low gloss is easily obtained, which is preferable.

On the other hand, the roughness of the surface of the printed matter with high gloss is filled with the clear ink, thereby forming a smooth surface and thus providing smoothness. When the roughness of the surface is filled with the clear ink, it is preferable to increase the proportion of the resin of the clear ink because the roughness of the surface is filled with a less amount of the clear ink so that printed matter with high gloss can be easily formed.

Surfactant

The clear ink preferably contains a surfactant.

Inclusion of a surfactant in the clear ink decreases the surface tension so that ink droplets that have reached a recording medium such as paper quickly permeate the recording medium. Therefore, occurrence of feathering and color bleed are reduced.

Surfactants are classified into nonionic, anionic, and amphoteric surfactants by polarity of the hydrophilic group.

They are also classified into fluorine-based, silicone-based, and acetylene-based surfactants by the structure of the hydrophobic group.

Mostly, fluorochemical surfactants are used in the present disclosure and can be used in combination with silicone-based surfactants and acetylene-based surfactants.

The proportion of the surfactant is preferably not greater than 2 percent by mass, more preferably from 0.05 to 2 percent by mass, and furthermore preferably from 0.1 to 2 percent by mass. When the proportion of the surfactant is not greater than 2 percent by mass, the gloss level significantly decreases in the low gloss printing mode.

Silicone-based surfactants, fluorochemical surfactants, amphoteric surfactants, nonionic surfactants, and anionic surfactants can be used as the surfactant.

There is no specific limit to the silicone-based surfactant. The silicone-based surfactant can be suitably selected to suit to a particular application. Of these, it is preferable to select silicone-based surfactants that are not decomposed even in a high pH environment.

Specific examples include, but are not limited to, side-chain-modified polydimethyl siloxane, both-terminal-modified polydimethyl siloxane, one-terminal-modified polydimethyl siloxane, and side-chain-both-terminal-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams.

Specific examples of the perfluoroalkyl carboxylic acid compounds include, but are not limited to, perfluoroalkyl carboxylic acid and salts of perfluoroalkyl carboxylic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit and can be suitably selected to suit to a particular application. Specific examples thereof include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitable synthetic surfactant and any product available on the market can be used. Products available on the market can be obtained from Byc Chemie Japan Co., Ltd., Shin-Etsu Silicone Co., Ltd., Dow Corning Toray Co., Ltd., and NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

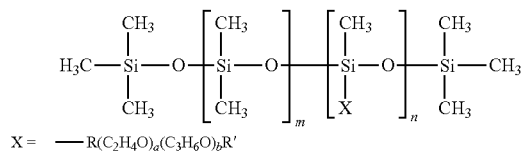

Chemical formula S-1

In the Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2-16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

$CF_3CF_2(CF_2CF_2)_m$—$CH_2CH_2O(CH_2CH_2O)_n$  Chemical formula F-1

In the Chemical formula F-1, "m" is preferably 0 or an integer of from 1 to 10 and "n" is preferably 0 or an integer of from 1 to 40.

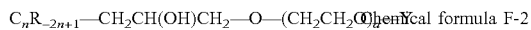
$C_nR_{-2n+1}$—$CH_2CH(OH)CH_2$—O—$(CH_2CH_2O)_a$—H  Chemical formula F-2

In the compound represented by the chemical formula F-2, Y represents H or $C_mF_{2m+1}$, where n represents an integer of from 1 to 6, or $CH_2CH(OH)CH_2$—$C_mF_{2m+1}$, where m represents an integer of from 4 to 6, or $C_pH_{2p+1}$, where p is an integer of from 1 to 19. "n" represents an integer of from 1 to 6. "a" represents an integer of from 4 to 14.

As the fluorochemical surfactant, products available on the market may be used.

Specific examples include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M Ltd.); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

Organic Solvent

The clear ink contains the compound represented by Chemical formula 1 and may contain other organic solvents. The organic solvent has no particular limit and can be suitably selected to suit to a particular application. For example, water-soluble organic solvents are suitable. One of the definitions of "water soluble" is that 5 or more grams are dissolved in 100 g of water at 25 degrees C.

Specific examples of the water-soluble organic solvent include, but are not limited to, polyols such as ethylene glycol, diethylene glycol, 1,2-propane diol, 1,3-propane diol, 1,2-butane diol, 1,3-butane diol, 2,3-butane diol, 3-methyl-1,3-butane diol, 3-methoxy-3-methylbutanol, triethylene glycol, polyethylene glycol, polypropylene glycol, 1,5-pentane diol, 2-methyl-2,4-pentane diol, 1,6-hexane diol, glycerin, 1,2,6-hexane triol, 2-ethyl-1,3-hexane diol, ethyl-1,2,4-butane triol, 1,2,3-butane triol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and dipropylene glycol monoethyl ether; polyol aryl ethers such as ethylene glycol monophenyl ether and ethylene glycol monobenzyl ether; nitrogen-containing heterocyclic compounds such as 2-pyrolidone, N-methyl-2-pyrolidone, N-hydroxyethyl-2-pyrolidone, 1,3-dimethylimidazolidinone, ε-caprolactam, and γ-butyrolactone; amides such as formamide, N-methylformamide, and N,N-dimethylformamide; amines such as monoethanolamine, diethanolamine, and triethanolamine; sulfur-containing compounds such as dimethyl sulfoxide, sulfolane, and thiodiethanol; propylene carbonate, and ethylene carbonate. These can be used alone or in combination.

The proportion of the organic solvent in the clear aqueous ink has no particular limit and can be suitably selected to suit to a particular application.

In terms of the drying property and discharging reliability of the ink, the proportion is preferably from 10 to 60 percent by mass and more preferably 20 to 60 percent by mass.

The clear aqueous ink may furthermore optionally contain substances such as a defoaming agent, a preservatives and fungicides, a corrosion inhibitor, and a pH regulator.

Defoaming Agent

The defoaming agent has no particular limit and examples thereof include, but are not limited to silicon-based defoaming agents, polyether-based defoaming agents, and aliphatic acid ester-based defoaming agents. These can be used alone or in combination. Of these, silicone-based defoaming agents are preferable in terms of the effect of breaking foams.

Preservatives and Fungicides

The preservatives and fungicides are not particularly limited. A specific example is 1,2-benzisothiazoline-3-one.

Corrosion Inhibitor

The corrosion inhibitor has no particular limitation. Examples are acid sulfites and sodium thiosulfates.

pH Regulator

The pH regulator has no particular limit. It is preferable to adjust the pH to be from 7 or higher. Specific examples include, but are not limited to, amines such as di ethanol amine and triethanol amine.

Coloring Material

The coloring material has no particular limit and includes pigments and dyes.

As the pigment, both inorganic pigments and organic pigments can be used. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The type of dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material of the ink is preferably from 0.1 to 15 percent by mass and more preferably from 1 to 10 percent by mass in terms of image density, fixability, and discharging stability.

To disperse a pigment in ink, for example, a hydrophilic functional group is introduced into the pigment to prepare a self-dispersible pigment, the surface of the pigment is coated with a resin, or a dispersant is used.

To introduce a hydrophilic group into a pigment, for example, a functional group such as a sulfone group and a carboxyl group is added to a pigment (e.g., carbon) to make it dispersible in water.

To coat the surface of a pigment with a resin, the pigment is encapsulated into microcapsules to make the pigment dispersible in water. This can be referred to as a resin-coated pigment. In this case, all the pigments to be added to ink are not necessarily entirely coated with a resin. Pigments partially or entirely not covered with a resin may be dispersed in the ink unless such pigments have an adverse impact.

A known small or large molecular weight dispersant, which is represented by a surfactant, can be used to disperse the coloring material in the ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitably used as the dispersant.

Those can be used alone or in combination.

Pigment Dispersion

The ink can be obtained by mixing a pigment with materials such as water and an organic solvent. It is also possible to mix a pigment with water, a dispersant, and other substances to prepare a pigment dispersion and thereafter mix the pigment dispersion with materials such as water and an organic solvent to manufacture an ink.

The pigment dispersion can be obtained by dispersing water, a pigment, a pigment dispersant, and other optional components followed by adjusting the particle size. It is good to use a dispersing device for dispersion.

The particle diameter of the pigment in the pigment dispersion has no particular limit. For example, when the maximum frequency is preferably from 20 to 500 nm and more preferably from 20 to 150 nm in the maximum number conversion, dispersion stability of the pigment is enhanced and discharging stability and the image quality such as image density are also improved. The particle diameter of the pigment can be analyzed using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with an instrument such as filter and a centrifuge to remove coarse particles followed by deaerating.

Properties of the clear aqueous ink are not particularly limited and can be suitably selected to suit to a particular application. Properties such as viscosity, surface tension, and pH are preferably in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by an instrument such as a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the clear aqueous ink is preferably 35 or less mN/m and more preferably 32 or less mN/m at 25 degrees C. in terms of suitable leveling of the ink on a recording medium and quickly drying the ink.

pH of the clear aqueous ink is preferably from 7 to 12 and more preferably from 8 to 11 in terms of prevention of corrosion of metal material in contact with liquid.

Printed Matter

The printed matter is not limited to items used as recording media and includes building materials such as wall paper, floor material, and tiles, cloth for apparel such as T-shirts, textile, and leather. In addition, substances such as ceramics, glass, and metal can be used as the printed matter if the configuration of the paths through which the recording medium is conveyed is adjusted.

The recording medium is not particularly limited and products such as plain paper, gloss paper, special paper, and cloth are usable. Also, good images can be formed on a non-permeable substrate.

The non-permeable substrate has a surface with low moisture permeability and absorbency and includes a material having a number of hollow spaces inside that are not open to the outside. To be more quantitative, the substrate has a water-absorbency of 10 or less mL/m$^2$ from the start of the contact until 30 msec$^{1/2}$ later according to Bristow's method. Examples of the non-permeable substrate include, but are not limited to, plastic films such as polyvinyl chloride resin film, polyethylene terephthalate (PET) film, acrylic resin film, polypropylene film, polyethylene film, and polycarbonate film.

In the present disclosure, it is preferable to use printed matter having high gloss in the low gloss printing mode. This is because the low gloss effect by the clear ink tends to be emphasized in the case of the printed matter having high gloss.

In the present disclosure, it is preferable to use printed matter having low gloss in the high gloss printing mode. This is because the high gloss effect by the clear ink tends to be emphasized in the case of the printed matter having low gloss.

Therefore, it is preferable that the following relationship be satisfied: Glgloss>Ghgloss and more preferable: Glgloss−Ghgloss≥100, where Glgloss represents the gloss of the printed matter in the low gloss printing mode and Ghgloss represents the gloss of the printed matter in the high gloss printing mode.

Method of Controlling Gloss of Printed Image

An embodiment of the method of controlling gloss of printed images includes discharging a clear aqueous ink containing a resin, a compound represented by Chemical formula 1, and water to printed matter to form a printing layer thereon and heating the printed matter printed with the clear aqueous ink and has a low gloss printing mode in which low gloss is imparted and a high gloss printing mode in which high gloss is imparted. When printed in the low printing mode, the heating temperature is controlled to be high. When printed in the high printing mode, the heating temperature is controlled to be low.

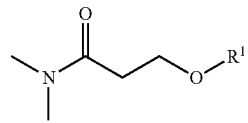

1

In Chemical formula 1, R$^1$ represents an alkyl group having 1 to 4 carbon atoms.

Printed Product

The printed product relating to the present disclosure includes printed matter and a printing layer formed on the printed matter. The printing layer includes a clear ink layer containing a resin. The printed product has a low gloss printing image printed in the low gloss printing mode and/or a high gloss printing image printed in the high gloss printing mode. The 60 degree gloss Ga of the high gloss printing image and the 60 degree gloss Gb of the printed matter for use in the high gloss printing mode satisfy the following relationship: Ga−Gb≥20. The 60 degree gloss Gc of the low gloss printing image and the 60 degree gloss Gd of the printed matter for use in the low gloss printing mode satisfy the following relationship: Gc−Gd<=−20.

The printed product can be obtained by forming images by the inkjet printing device executing the inkjet printing method.

According to the present disclosure, it is possible to obtain both low gloss and high gloss printed products for the same printed matter. When different printed matter is used, a high gloss printed matter can be changed to low gloss and the other way round.

Recording Device and Recording Method

In the following description of the recording device and the recording method, an example is described using black (K), cyan (C), magenta (M), and yellow (Y). It is possible to use the clear aqueous ink in place of or in addition to those.

The clear aqueous ink of the present disclosure is applicable to various recording devices employing an inkjet recording method, such as printers, facsimile machines, photocopiers, multifunction peripherals (serving as a printer, a facsimile machine, and a photocopier), and 3D model manufacturing devices (3D printers, additive manufacturing device, etc.).

In addition, the inkjet printing device includes both a serial type device in which the liquid discharging head moves and a line type device in which the liquid discharging head is not moved, unless otherwise specified.

Furthermore, in addition to the desktop type, this inkjet recording device includes a recording device capable of printing images on a wide recording medium such as A0 and a continuous printer capable of using continuous paper reeled up in a roll form as recording media.

In the present disclosure, the recording device and the recording method respectively represent a device capable of discharging ink, various processing fluids, etc. to a recording medium and a method of conducting recording utilizing the device. The recording medium means an item to which ink or various processing fluids can be attached even temporarily.

The recording device may further optionally include a device relating to feeding, conveying, and ejecting the recording medium and other devices such as a pre-processing device and a post-processing device in addition to the head portion to discharge the ink.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head moves and a line type device in which the discharging head is not moved, unless otherwise specified.

Furthermore, in addition to the desktop type, this recording device includes a device capable of printing images on a wide recording medium such as A0 and a continuous printer capable of using continuous paper reeled up in a roll form as recording media.

Figure 2:
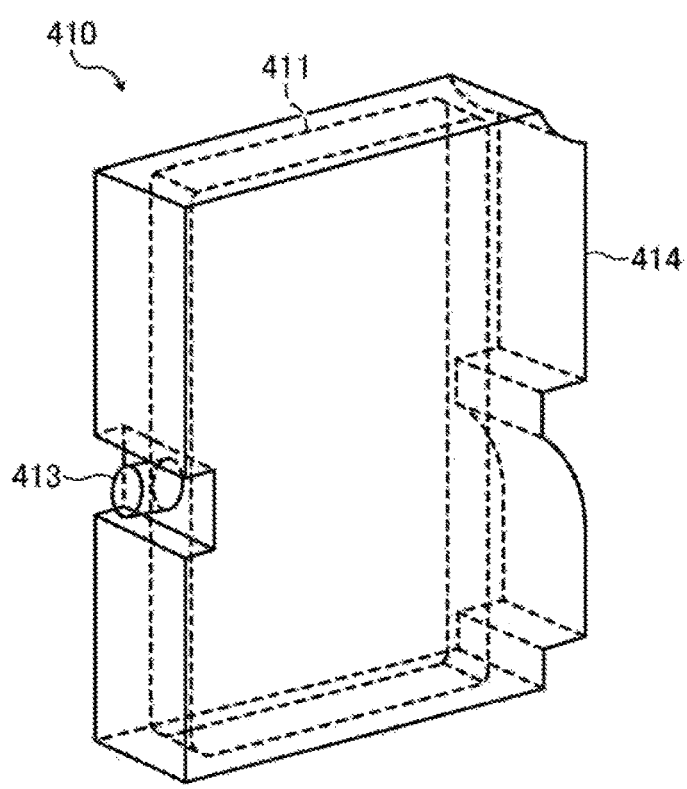
FIG. 2 is a diagram illustrating a perspective view of an example of a tank of the image forming device illustrated in FIG. 1.

The recording device is described using an example with reference to FIG. 1 and FIG. 2. FIG. 1 is a diagram illustrating a perspective view of the recording device. FIG. 2 is a diagram illustrating a perspective view of a tank. An image forming device 400, which is an embodiment of the recording device, is a serial type image forming device. A mechanical assembly 420 is disposed in an exterior 401 of the image forming device 400. Each ink containing unit 411 of each tank 410 (410k, 410c, 410m, and 410y) for each color of black (K), cyan (C), magenta (M), and yellow (Y) is made of a packaging member such as aluminum laminate film. The ink containing unit 411 is disposed in, for example, a plastic container housing unit 414. The tank 410 is used as an ink cartridge of each color.

A cartridge holder 404 is disposed on the rear side of the opening formed when a cover 401c is opened. The cartridge holder 404 is detachably attached to the tank 410. As a result, each ink discharging outlet 413 of the tank 410 communicates with a discharging head 434 for each color via a supplying tube 436 for each color so that the ink can be discharged from the discharging head 434 to a recording medium.

This recording device may include not only a portion to discharge ink but also a device referred to as a pre-processing device and a post-processing device.

As an example of the pre-processing device and the post-processing device, as in the case of the ink such as black (K), cyan (C), magenta (M), and yellow (Y), the pre-processing device and the post-processing device each may further include a liquid accommodating unit containing a pre-processing fluid or a post-processing fluid to discharge the pre-processing fluid or the post-processing fluid according to an inkjet printing method.

As another example of the pre-processing device and the post-processing device, it is possible to dispose a pre-processing device and a post-processing device which do not employ the inkjet printing method but a blade coating method, a roll coating method, or a spray coating method.

Figure 3:
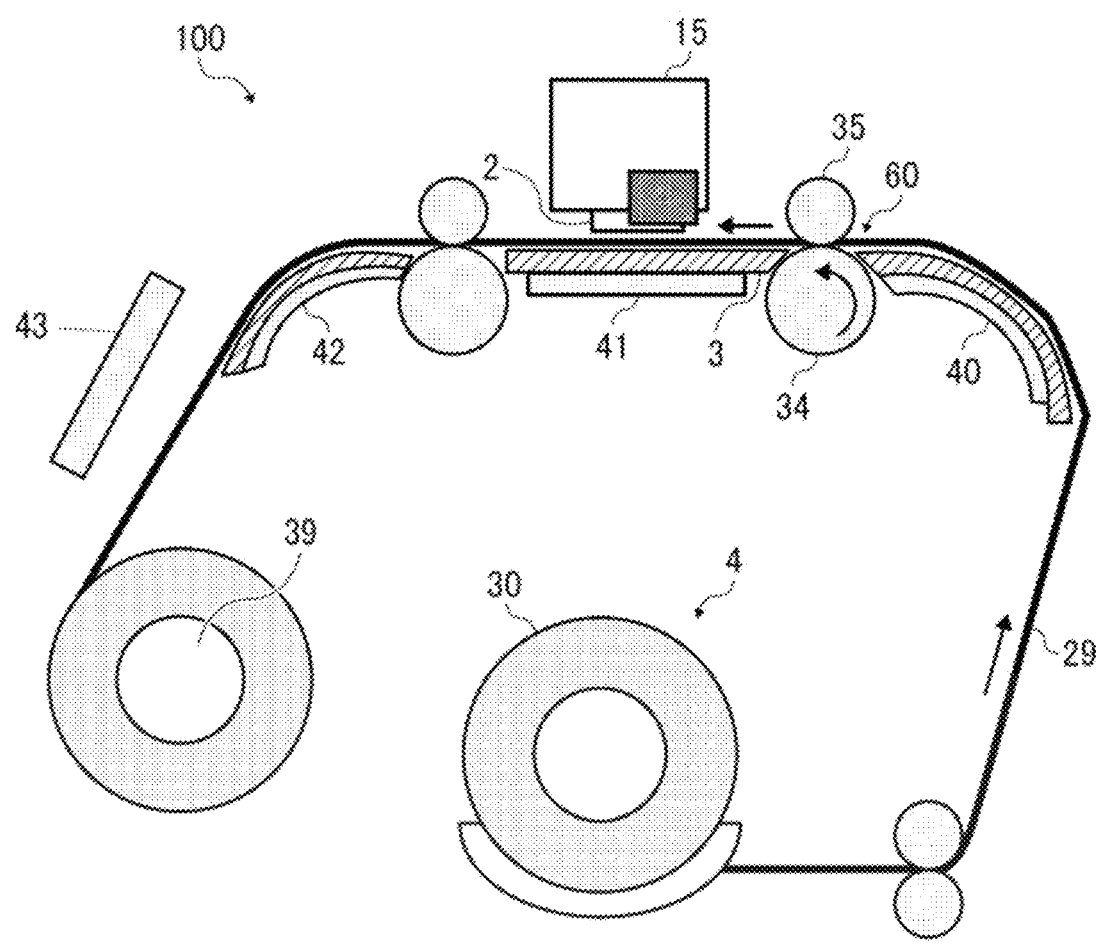
FIG. 3 is a schematic diagram illustrating an example of the inside of an inkjet recording device.

FIG. 3 is a diagram illustrating the inside of the inkjet printing device 100 having a recording head 2, a platen 3, a roll medium containing unit 4, and heating devices.

A carriage 15 carries the recording head 2 that discharges ink droplets and holds clear ink and optional color inks of black (K), yellow (Y), magenta (M), and cyan (C).

The roll medium containing unit 4 feeds a roll medium 30 as printed matter set therein.

A conveyance device 60 includes a feeding roller 34 and a pressing roller 35 facing each other sandwiching the platen 3 from top and bottom.

While the printed matter (recording medium) 29 is nipped between the feeding roller 34 and the pressing roller 35, the feeding roller 34 is rotated forward in the direction indicated by the arrow in FIG. 3 to convey forward the recording medium 29 fed onto the platen 3.

There are provided a pre-heater 40 to preliminarily heat the recording medium 29, which is disposed upstream of the platen 3 in the recording medium feeding direction and a print heater 41 that heats the recording medium 29 during printing when the clear ink is attached to the printed matter from nozzles of the recording head 2.

The inkjet printing device 100 may include a post heater 42 disposed downstream of the platen 3 in the recording medium feeding direction to heat the printed product after printing. It is preferable to provide the post heater 42 to subsequently heat the recording medium 29 so that the deposited ink droplets can quickly dry.

The pre-heater 40, the print heater 41, and the post heater 42 use conduction heating heaters using ceramic or nichrome wire and other devices. Other heating devices such as heated wind can be used.

Moreover, another heating device such as a hot air fan 43 may be provided downstream of the starting point of the post heater 42. The hot air fan 43 blows hot air to the image-recorded surface of the recording medium 29 on which the ink droplets have been deposited.

Hot air is directly blown to the ink on the image-recorded surface by the hot air fan 43 so that the ink completely dries. Thereafter, the recording medium 29 is reeled up by a reeling roller 39.

How to use the ink is not limited to the inkjet printing method.

Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The usage of the ink is not particularly limited and can be suitably selected to suit to a particular application. For example, the ink can be used for printed matter, a paint, a coating material, and foundation. The ink can be also used to form two-dimensional texts and images and furthermore a three-dimensional solid object (3D modeling object) as a material for 3D modeling.

An apparatus for manufacturing a solid freeform fabrication that fabricates a three-dimensional solid object can be any known device with no particular limit. For example, the apparatus may include a device such as an ink container, supplying device, discharging device, and drier. The solid freeform fabrication object includes an object manufactured by repeatedly coating the ink. The solid freeform fabrication object includes a molded processed product obtained by processing a structure having a substrate such as a recording medium to which an ink is applied. For example, the molded processed product can be fabricated from recorded matter or a structure having a sheet-like form or film-like form by heating drawing or punching. The molded processed product is suitably used as parts molded after surface-decorating. Examples include, but are not limited to, gauges or operation panels of vehicles, office machines, electric and electronic devices, cameras.

The terms such as image forming, recording, and printing in the present disclosure represent the same meaning.

Also, recording media, media, and substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation Example 1

Preparation of Polycarbonate-Based Polyurethane Resin Emulsion

A total of 1,500 parts of polycarbonate diol (reaction product (number average molecular weight (Mn) of 1,200) of 1,6-hexanediol and dimethyl carbonate), 220 parts of 2,2-dimethylol propionic acid (DMPA), and 1,347 parts of N-methyl pyrrolidone (NMP) were charged in a reaction container equipped with a stirrer, a reflux cooling tube, and a thermometer followed by heating to 60 degrees C. in a nitrogen atmosphere to dissolve DMPA.

Next, 1,445 parts of 4,4'dicyclohexyl methane diisocyanate and 2.6 parts of dibutyl tin laurate (catalyst) were added followed by heating to 90 degrees C. to allow urethanation reaction over five hours to obtain isocyanate terminated urethane prepolymer. This reaction mixture was cooled down to 80 degrees C. and 149 parts of triethyl amine was admixed therewith. A total of 4,340 parts of the resulting mixture was weighed and charged in a liquid mixture of 5,400 parts of water and 15 parts of triethyl amine during vigorous stirring.

Thereafter, 1,500 parts of ice and 626 parts of 35 percent by mass 2-methyl-1,5-pentane diamine aqueous solution were added to allow chain elongation reaction followed by distillation of the solvent to achieve a solid portion concentration of 30 percent by mass, thereby obtaining polycarbonate-based polyurethane resin emulsion.

The polycarbonate-based polyurethane resin emulsion was analyzed by a film forming temperature tester (manufactured by IMOTO MACHINERY CO., LTD.). The minimum film-forming temperature was 55 degrees C.

Preparation Example 2

Preparation of Acrylic Resin Emulsion 1

A total of 900 parts of deionized water and 1 part of sodium lauryl sulfate were charged in a reaction container equipped with a stirrer, a reflux condenser, a dripping device, and a thermometer and heated to 70 degrees C. while nitrogen was replaced during stirring. While the temperature inside was maintained at 70 degrees C., 4 parts of potassium persulfate was added as a polymerization initiator and dissolved. An emulsion preliminarily prepared by adding 450 parts of deionized water, 3 parts of sodium lauryl sulfate, 20 parts of acrylamide, 365 parts of styrene, 545 parts of butyl acrylate, and 10 parts of methacrrylic acid was continuously added dropwise to the reaction solution in four hours. After the completion of the addition, the resulting emulsion was maintained for three hours. After the thus-obtained aqueous emulsion was cooled down to room temperature, deionized water and sodium hydroxide aqueous solution were added to adjust pH to 8 to obtain an acrylic resin emulsion 1 (concentration of solid content of 30 percent by mass).

Manufacturing Example 1

Manufacturing of Clear aqueous Ink A

The polyurethane resin emulsion 1 (concentration of solid content of 30 percent by mass) of Preparation Example 1 at 25 percent by mass, 1,2-propane diol at 16 percent by mass, 1,3-propane diol at 9.5 percent by mass, 1,2-butane diol at 3 percent by mass, the compound represented by Chemical formula 1 where R1 is a methyl group (Equamide™ M100, manufactured by Idemitsu Kosan Co., Ltd.) at 3.5 percent by mass, a fluorochemical surfactant (FS-300, concentration of solid content of 40 percent by mass, manufactured by E.I. du Pont de Nemours and Company) at 6 percent by mass, and highly pure water at 37 percent were admixed and stirrer to prepare a mixture.

The thus-obtained mixture was filtered by a polypropylene filter (Betafine polypropylene pleated filter PPG series, manufactured by 3M Company) having an average pore diameter of 0.2 μm to prepare a clear aqueous ink A.

Manufacturing Examples 2 to 9

Manufacturing of Clear Aqueous Inks B to I

Clear aqueous inks B to I were prepared in the same manner as in Manufacturing Example 1 except that the ink formulations were changed as shown in Table 1.

TABLE 1

| | | Manufacturing Example | | | | |
|---|---|---|---|---|---|---|
| | | 1 Clear aqueous ink A | 2 Clear aqueous ink B | 3 Clear aqueous ink C | 4 Clear aqueous ink D | 5 Clear aqueous ink E |
| Resin | Polyurethane resin emulsion 1 (aqueous dispersibility, solid content: 30 percent by mass) | 25 | 30 | 30 | 40 | — |
| | Acrylic resin emulsion 1 (aqueous dispersibility, solid content: 30 percent by mass) | — | — | — | — | 40 |

TABLE 1-continued

| | | | | | | |
|---|---|---|---|---|---|---|
| Surfactant | FS-300/manufactured by E. I. du Pont de Nemours and Company (solid content: 40 percent by mass) | 6 | 6 | 4.5 | 4.5 | 4.5 |
| Organic solvent | 1,2-Propane diol | 16 | 14.5 | 15.2 | 12 | 12 |
| | 1,3-Propane diol | 9.5 | 9.5 | 9.5 | 9.5 | 9.5 |
| | 1,2-Butanediol | 3 | 3 | 3 | 3 | 3 |
| Compound of Chemical formula 1 | Equamide ™ M100 $R^1$ of compound of chemical formula 1 is methyl group | 3.5 | 3.5 | 3.5 | 3.5 | 3.5 |
| | Equamide ™ B100 $R^1$ of compound of chemical formula 1 is butyl group | — | — | — | — | — |
| Water | Highly pure water | 37 | 33.5 | 34.3 | 27.5 | 27.5 |
| Total (Percent by mass) | | 100 | 100 | 100 | 100 | 100 |

| | | Manufacturing Example | | | |
|---|---|---|---|---|---|
| | | 6 Clear aqueous ink F | 7 Clear aqueous ink G | 8 Clear aqueous ink H | 9 Clear aqueous ink I |
| Resin | Polyurethane resin emulsion 1 (aqueous dispersibility, solid content: 30 percent by mass) | 25 | 25 | 25 | 25 |
| | Acrylic resin emulsion 1 (aqueous dispersibility, solid content: 30 percent by mass) | — | — | — | — |
| Surfactant | FS-300/manufactured by E. I. du Pont de Nemours and Company (solid content: 40 percent by mass) | 6 | 6 | 6 | 6 |
| Organic solvent | 1,2-Propane diol | 15 | 12 | 3 | 19 |
| | 1,2-Propane diol | 8.5 | 4.5 | 1.5 | 11 |
| | 1,2-Butanediol | 3 | 3 | 1 | 3 |
| Compound of Chemical formula 1 | Equamide ™ M100 $R^1$ of compound of chemical formula 1 is methyl group | 4.5 | — | 20 | — |
| | Equamide ™ B100 $R^1$ of compound of chemical formula 1 is butyl group | — | 10 | — | — |
| Water | Highly pure water | 38 | 39.5 | 43.5 | 36 |
| Total (Percent by mass) | | 100 | 100 | 100 | 100 |

Manufacturing Example 8

Manufacture of Magenta Ink

Preparation of Self-Dispersible Type Magenta Pigment Dispersion

After the following formulated materials were preliminarily mixed, the mixture was subject to circulation dispersion for seven hours with a disk type bead mill (KDL type, media: zirconia ball having a diameter of 0.3 mm, manufactured by SHINMARU ENTERPRISES CORPORATION) to obtain a self-dispersible magenta pigment dispersion (concentration of pigment solid portion: 15 percent by mass).

| | |
|---|---|
| Pigment Red 122 (Toner Magenta EO02, manufactured by Clariant Japan KK) | 15 parts by mass |
| Anionic surfactant (Pionine A-51-B, manufactured by TAKEMOTO OIL & FAT Co., Ltd ): | 2 parts |
| Deionized water: | 83 parts |

Manufacture of Magenta Ink

Firstly, 25 percent by mass the polyurethane resin emulsion 1 (concentration of solid content: 30 percent by mass) of Preparation Example 1, 20 percent by mass self-dispersible magenta pigment dispersion (concentration of pigment solid portion: 15 percent by mass), 20 percent by mass 1,2-propane diol, 11 percent 1,3-propanediol, 3 percent by mass 1,2-butanediol, 6 percent by mass a fluorochemical surfactant (FS-300, concentration of solid content of 40 percent by mass), and 15 percent by mass high-purity water were admixed and stirred to prepare a mixture.

Next, the thus-obtained mixture was filtered by a polypropylene filter (Betafine polypropylene pleated filter PPG series, manufactured by 3M Company) having an average pore diameter of 0.2 μm to prepare a magenta ink.

Example 1

Evaluation on Gloss Control Image

Inkjet Printing for Gloss Image

The ink cartridge for a remodeled inkjet printer (GX5500, manufactured by Ricoh Co. Ltd.) was filled with clear aqueous ink A of Manufacturing Example 1 and was mounted onto the remodeled inkjet printer to enable inkjet printing.

The remodeled inkjet printer GX5500H was equipped with heaters (temperature controller, model MTCD, manufactured by MISUMI Group Inc.) to heat the rear side of recording media before, during, and after printing.

This configuration enabled printing on a recording medium heated by the heaters before and during printing and the heat drying of the clear aqueous ink by the heater after printing.

In the high gloss printing mode and low gloss printing mode, different images were printed on different recording media and under different heating conditions.

Recording Medium

In the high gloss printing mode, synthetic paper VJFN160 (white polypropylene film, gloss 16 (60 degree gloss value, manufactured by Yupo Corporation) was used as the recording medium 1.

In the low gloss printing mode, a window film GIY-0305 (transparent polyethylene terephthalate (PET) film, gloss 159 (60 degree gloss value, manufactured by Lintec Corporation) was used as the recording medium 2.

Heating Conditions

The heating temperatures of each heater (heating device) disposed before, during, and after printing in the high gloss printing mode were respectively set at 60 degrees C., 60 degrees C., and 70 degrees C. The heating temperatures of each heater disposed before, during, and after printing in the low gloss printing mode were respectively set at 65 degrees C., 65 degrees C. and 70 degrees C. When the temperature of the recording medium during printing was measured, the temperature (=Thgloss) of the recording medium in the high gloss printing mode was 59 degrees C. and the temperature (=HThgloss) of the heating device during printing in the high gloss printing mode was 60 degrees C. When the temperature of the recording medium during printing was measured, the recording medium temperature (=Tlgloss) in the low gloss printing mode was 64 degrees C., and the temperature (=HTlgloss) of the heating device during printing in the low gloss printing mode was 65 degrees C.

The temperature of the recording medium during printing was measured by a digital radiation temperature sensor (FT-H10, manufactured by KEYENCE CORPORATION).

The image printed in the high gloss printing mode was a solid image with an image resolution of 600 dpi×600 dpi with a printing ratio of 100 percent.

The image printed in the low gloss printing mode was a halftone image with an image resolution of 600 dpi×600 dpi with a printing ratio of 40 percent.

Printing Ratio

The printing ratio means the following.

$$\text{Printing ratio (percent)} = \{(\text{number of printed dots of clear ink})/(\text{longitudinal resolution} \times \text{latitudinal resolution})\} \times 100$$

The number of printed dots of clear ink means the number of dots of clear ink actually printed per unit of area and longitudinal resolution and latitudinal each resolution represent resolutions per unit of area. When the clear ink is overlapped on the same dot position, the number of printed dots of clear ink means the number of dots of clear ink actually printed per unit of area.

The recording medium is subjected to printing with the clear aqueous ink A in such a manner that the clear aqueous ink A was directly overlapped once at the same dot position in both the low gloss printing mode and high gloss printing mode.

Next, the gloss of the thus-obtained printed product was measured in the following manner. The printing conditions are shown in Table 2 and the results are shown in Table 3.

Gloss

The 60 degree gloss value was measured at both the clear ink printing portion printed with the clear aqueous ink A and the non-clear ink printing portion (i.e., recording medium) printed with no clear aqueous ink A was measured by a gloss measuring instrument (micro-tri-gloss, manufactured by BYK). The 60 degree gloss value was defined as gloss.

Example 2

The printed product of Example 2 was obtained in the same manner as in Example 1 except that the image printed in the high gloss printing mode was changed to a half tone image with a resolution of 600 dpi×600 dpi and a printing ratio of 80 percent, and the image printed in the low printing mode was changed to a half tone image with a resolution of 600 dpi×600 dpi and a printing ratio of 70 percent. The gloss of the thus-obtained printed products was measured in the same manner as in Example 1. The results are shown in Table 3.

Example 3

The printed product of Example 3 was obtained in the same manner as in Example 1 except that the heating temperatures of each heater disposed before, during, and after printing in the high gloss printing mode were respectively set to 50 degrees C., 50 degrees C., and 70 degrees C. and the heating temperatures of each heater disposed before, during, and after printing in the low gloss printing mode were respectively set to 70 degrees C., 70 degrees C., and 70 degrees C. The gloss of the thus-obtained printed products was measured in the same manner as in Example 1. The results are shown in Table 3.

When the temperature of the recording medium during printing was measured, the temperature (=Thgloss) of the recording medium in the high gloss printing mode was 49 degrees C., and the temperature (=HThgloss) of the heating device during printing in the high gloss printing mode was 50 degrees C. When the temperature of the recording medium during printing was measured, the recording medium temperature (=Tlgloss) in the low gloss printing mode was 68 degrees C., and the temperature (=HTlgloss) of the heating device during printing in the low gloss printing mode was 70 degrees C.

Example 4

The printed product of Example 4 was obtained in the same manner as in Example 3 except that the clear aqueous ink A of Manufacturing Example 1 was changed to the clear aqueous ink B of Manufacturing Example 2. The gloss of the thus-obtained printed products was measured in the same manner as in Example 1. The results are shown in Table 3.

Example 5

The printed product of Example 5 was obtained in the same manner as in Example 3 except that the clear aqueous ink A of Manufacturing Example 1 was changed to the clear aqueous ink C of Manufacturing Example 3. The gloss of the thus-obtained printed products was measured in the same manner as in Example 1. The results are shown in Table 3.

Example 6

The printed product of Example 6 was obtained in the same manner as in Example 3 except that the clear aqueous ink A of Manufacturing Example 1 was changed to the clear aqueous ink D of Manufacturing Example 4. The gloss of the thus-obtained printed products was measured in the same manner as in Example 1. The results are shown in Table 3.

Example 7

The printed product of Example 7 was obtained in the same manner as in Example 3 except that the clear aqueous ink A of Manufacturing Example 1 was changed to the clear aqueous ink E of Manufacturing Example 5. The gloss of the thus-obtained printed products was measured in the same manner as in Example 1. The results are shown in Table 3.

Example 8

The printed product of Example 8 was obtained in the same manner as in Example 7 except that the recording medium printed with the magenta ink of Manufacturing Example 8 was used.

The magenta ink was applied by the same printing device as for the clear ink. The heating temperatures of the heater disposed before, during, and after printing for the magenta ink film used in the high gloss printing mode were respectively set to 50 degrees C., 50 degrees C., and 70 degrees C. and the heating temperatures of the heater disposed before, during, and after printing for the magenta ink film used in the low gloss printing mode were respectively set to 70 degrees C. 70 degrees C., and 70 degrees C. to apply only the magenta ink onto the recording medium. The image printed with the magenta ink was a solid image with an image resolution of 600 dpi×600 dpi with a printing ratio of 100 percent.

The clear ink was applied by the printing device to the recording medium onto which the magenta ink had been applied The gloss of the thus-obtained printed products was measured in the same manner as in Example 1. The results are shown in Table 3.

Example 9

The printed product of Example 9 was obtained in the same manner as in Example 1 except that the clear aqueous ink A of Manufacturing Example 1 was changed to the clear aqueous ink F of Manufacturing Example 6. The gloss of the thus-obtained printed products was measured in the same manner as in Example 1. The results are shown in Table 3.

Comparative Example 1

The printed product of Comparative Example 1 was obtained in the same manner as in Example 2 except that the same temperatures of the heater in the high gloss printing mode were respectively set to 65 degrees C. 65 degrees C., and 70 degrees C. as those in the low gloss printing mode. The gloss of the thus-obtained printed products was measured in the same manner as in Example 1. The results are shown in Table 3.

When the temperature of the recording medium during printing was measured, the temperature (=Thgloss) of the recording medium in the high gloss printing mode was 64 degrees C., and the temperature (=HThgloss) of the heating device during printing in the high gloss printing mode was 65 degrees C. When the temperature of the recording medium during printing was measured, the recording medium temperature (=Tlgloss) in the low gloss printing mode was 64 degrees C., and the temperature (=HTlgloss) of the heating device during printing in the low gloss printing mode was 65 degrees C.

Comparative Example 2

The printed product of Comparative Example 2 was obtained in the same manner as in Example 1 except that the same temperatures of the heater in the high gloss printing mode were respectively set to 65 degrees C. 65 degrees C., and 70 degrees C. as those in the low gloss printing mode. The gloss of the thus-obtained printed products was measured in the same manner as in Example 1. The results are shown in Table 3.

When the temperature of the recording medium during printing was measured, the temperature (=Thgloss) of the recording medium in the high gloss printing mode was 64 degrees C., and the temperature (=HThgloss) of the heating device during printing in the high gloss printing mode was 65 degrees C. When the temperature of the recording medium during printing was measured, the recording medium temperature (=Tlgloss) in the low gloss printing mode was 64 degrees C., and the temperature (=HTlgloss) of the heating device during printing in the low gloss printing mode was 65 degrees C.

Comparative Example 3

The magenta ink of Manufacturing Example 6 was printed on the recording medium. The magenta ink was applied by the same printing device as for the clear ink. The heating temperatures of the heater disposed before, during, and after printing for the magenta ink film used in the high gloss printing mode were respectively set to 50 degrees C., 50 degrees C., and 70 degrees C. and the heating temperatures of the heater disposed before, during, and after printing for the magenta ink film used in the low gloss printing mode were respectively set to 70 degrees C., 70 degrees C., and 70 degrees C. The gloss of the thus-obtained printed products was measured in the same manner as in Example 1. The results are shown in Table 3. The image printed with the magenta ink was a solid image with an image resolution of 600 dpi×600 dpi with a printing ratio of 100 percent.

The gloss of the magenta ink film in the high gloss printing mode was 30 while the gloss of the foundation of the medium was 16 and the gloss of the magenta ink film in the low gloss printing mode was 102 while the gloss of the foundation of the medium was 159.

Comparative Example 4

The printed product of Comparative Example 4 was obtained in the same manner as in Comparative Example 2 except that the temperatures of the heater in the low gloss printing mode were respectively set to 60 degrees C., 60 degrees C., and 70 degrees C. The gloss of the thus-obtained printed products was measured in the same manner as in Example 1. The results are shown in Table 3.

TABLE 2

| | | Printing condition | | | |
|---|---|---|---|---|---|
| | Type of ink | Printing mode | Recording medium | Printed image | Printed region of clear in |
| Example 1 | Clear ink A | High gloss | VJFN160 | All solid image | Recording medium |
| | | Low gloss | GIY0305 | Half tone image | Recording medium |
| Example 2 | Clear ink A | High gloss | VJFN160 | Half tone image | Recording medium |
| | | Low gloss | GIY0305 | Half tone image | Recording medium |
| Example 3 | Clear ink A | High gloss | VJFN160 | All solid image | Recording medium |
| | | Low gloss | GIY0305 | Half tone image | Recording medium |
| Example 4 | Clear ink B | High gloss | VJFN160 | All solid image | Recording medium |
| | | Low gloss | GIY0305 | Half tone image | Recording medium |
| Example 5 | Clear ink C | High gloss | VJFN160 | All solid image | Recording medium |
| | | Low gloss | GIY0305 | Half tone image | Recording medium |
| Example 6 | Clear ink D | High gloss | VJFN160 | All solid image | Recording medium |
| | | Low gloss | GIY0305 | Half tone image | Recording medium |
| Example 7 | Clear ink E | High gloss | VJFN160 | All solid image | Recording medium |
| | | Low gloss | GIY0305 | Half tone image | Recording medium |
| Example 8 | Clear ink E + magenta ink | High gloss | VJFN160 | All solid image | Magenta ink film |
| | | Low gloss | GIY0305 | Half tone image | Magenta ink film |
| Example 9 | Clear ink F | High gloss | VJFN160 | All solid image | Recording medium |
| | | Low gloss | GIY0305 | Half tone image | Recording medium |
| Comparative Example 1 | Clear ink A | High gloss | VJFN160 | Half tone image | Recording medium |
| | | Low gloss | GIY0305 | Half tone image | Recording medium |
| Comparative Example 2 | Clear ink A | High gloss | VJFN160 | All solid image | Recording medium |
| | | Low gloss | GIY0305 | Half tone image | Recording medium |
| Comparative Example 3 | Magenta ink | High gloss | VJFN160 | All solid image | Not printed |

TABLE 2-continued

| | | | | | |
|---|---|---|---|---|---|
| | | Low gloss | GIY0305 | All solid image | Not printed |
| Comparative Example 4 | Clear ink A | High gloss | VJFN160 | All solid image | Recording medium |
| | | Low gloss | GIY0305 | Half tone image | Recording medium |

| | Printing condition | | | | |
|---|---|---|---|---|---|
| | | | Heater temperature | | |
| | Printing ratio | Number of overlapping of clear ink | Heater before printing | Heater during printing | Heater after printing |
| Example 1 | 100 percent | One | 60 degrees C. | 60 degrees C. | 70 degrees C. |
| | 40 percent | One | 65 degrees C. | 65 degrees C. | 70 degrees C. |
| Example 2 | 80 percent | One | 60 degrees C. | 60 degrees C. | 70 degrees C. |
| | 70 percent | One | 65 degrees C. | 65 degrees C. | 70 degrees C. |
| Example 3 | 100 percent | One | 50 degrees C. | 50 degrees C. | 70 degrees C. |
| | 40 percent | One | 70 degrees C. | 70 degrees C. | 70 degrees C. |
| Example 4 | 100 percent | One | 50 degrees C. | 50 degrees C. | 70 degrees C. |
| | 40 percent | One | 70 degrees C. | 70 degrees C. | 70 degrees C. |
| Example 5 | 100 percent | One | 50 degrees C. | 50 degrees C. | 70 degrees C. |
| | 40 percent | One | 70 degrees C. | 70 degrees C. | 70 degrees C. |
| Example 6 | 100 percent | One | 50 degrees C. | 50 degrees C. | 70 degrees C. |
| | 40 percent | One | 70 degrees C. | 70 degrees C. | 70 degrees C. |
| Example 7 | 100 percent | One | 50 degrees C. | 50 degrees C. | 70 degrees C. |
| | 40 percent | One | 70 degrees C. | 70 degrees C. | 70 degrees C. |
| Example 8 | 100 percent | One | 50 degrees C. | 50 degrees C. | 70 degrees C. |
| | 40 percent | One | 70 degrees C. | 70 degrees C. | 70 degrees C. |
| Example 9 | 100 percent | One | 60 degrees C. | 60 degrees C. | 70 degrees C. |
| | 40 percent | One | 65 degrees C. | 65 degrees C. | 70 degrees C. |
| Comparative Example 1 | 80 percent | One | 65 degrees C. | 65 degrees C. | 70 degrees C. |
| | 70 percent | One | 65 degrees C. | 65 degrees C. | 70 degrees C. |
| Comparative Example 2 | 100 percent | One | 65 degrees C. | 65 degrees C. | 70 degrees C. |
| | 40 percent | One | 65 degrees C. | 65 degrees C. | 70 degrees C. |
| Comparative Example 3 | 100 percent | — | 50 degrees C. | 50 degrees C. | 70 degrees C. |
| | 100 percent | — | 70 degrees C. | 70 degrees C. | 70 degrees C. |
| Comparative Example 4 | 100 percent | One | 65 degrees C. | 65 degrees C. | 70 degrees C. |
| | 40 percent | One | 60 degrees C. | 60 degrees C. | 70 degrees C. |

TABLE 3

| | Evaluation Results | | | | |
|---|---|---|---|---|---|
| | Temperature of recording medium during printing | Heater during printing (HTlgloss, HTlgloss) | Gloss | | Gloss difference |
| | | | Printed region of clear ink | Non-printed region of clear ink | Printed portion - Nonprinted portion |
| Example 1 | Tlgloss 59 degrees C. | 60 degrees C. | 55 | 16 | 39 |
| | Tlgloss 64 degrees C. | 65 degrees C. | 105 | 159 | −54 |
| Example 2 | Tlgloss 59 degrees C. | 60 degrees C. | 39 | 16 | 23 |
| | Tlgloss 64 degrees C. | 65 degrees C. | 127 | 159 | −32 |
| Example 3 | Tlgloss 49 degrees C. | 50 degrees C. | 61 | 16 | 45 |
| | Tlgloss 68 degrees C. | 70 degrees C. | 97 | 159 | −62 |
| Example 4 | Tlgloss 49 degrees C. | 50 degrees C. | 66 | 16 | 50 |
| | Tlgloss 68 degrees C. | 70 degrees C. | 89 | 159 | −70 |
| Example 5 | Tlgloss 49 degrees C. | 50 degrees C. | 63 | 16 | 47 |
| | Tlgloss 68 degrees C. | 70 degrees C. | 80 | 159 | −79 |
| Example 6 | Tlgloss 49 degrees C. | 50 degrees C. | 68 | 16 | 52 |
| | Tlgloss 68 degrees C. | 70 degrees C. | 75 | 159 | −84 |
| Example 7 | Tlgloss 49 degrees C. | 50 degrees C. | 69 | 16 | 53 |
| | Tlgloss 68 degrees C. | 70 degrees C. | 78 | 159 | −81 |
| Example 8 | Tlgloss 49 degrees C. | 50 degrees C. | 83 | 30 | 53 |
| | Tlgloss 68 degrees C. | 70 degrees C. | 37 | 102 | −65 |
| Example 9 | Tlgloss 59 degrees C. | 60 degrees C. | 53 | 16 | 37 |
| | Tlgloss 64 degrees C. | 65 degrees C. | 102 | 159 | −57 |
| Comparative Example 1 | Tlgloss 64 degrees C. | 65 degrees C. | 30 | 16 | 14 |
| | Tlgloss 64 degrees C. | 65 degrees C. | 140 | 159 | −19 |
| Comparative Example 2 | Tlgloss 64 degrees C. | 65 degrees C. | 35 | 16 | 19 |
| | Tlgloss 64 degrees C. | 65 degrees C. | 138 | 159 | −21 |

TABLE 3-continued

| | | Temperature of recording medium during printing | Heater during printing (HTlgloss, HTlgloss) | Evaluation Results | | Gloss difference |
| | | | | Gloss | | |
| | | | | Printed region of clear ink | Non-printed region of clear ink | Printed portion - Nonprinted portion |
|---|---|---|---|---|---|---|
| Comparative Example 3 | Tlgloss Tlgloss | 64 degrees C. 64 degrees C. | 65 degrees C. 65 degrees C. | — — | — — | — — |
| Comparative Example 4 | Tlgloss Tlgloss | 64 degrees C. 59 degrees C. | 65 degrees C. 60 degrees C. | 35 143 | 16 159 | 19 −16 |

* "-" as the result of gloss of Comparative Example 3 shown in Table 3 represents the gloss was not measurable.

As seen in the results shown in Tables 2 and 3, the gloss significantly decreased in the low gloss printing mode and increased in the high gloss printing mode in Examples 1 to 9 where Tlgloss>Thgloss (HTlgloss>Hthgloss) in comparison with Comparative Examples 1 and 2 where Tlgloss=Thgloss (HTlgloss=Hthgloss) and Comparative Example 4 where Tlgloss<Thgloss (HTlgloss<Hthgloss).

When Example 1 is compared with Example 2, the gloss difference was large in Example 1 where Dhgloss−Dlgloss=60 percent in comparison with Example 2 Dhgloss−Dlgloss=10 percent.

It was found that, as the proportion of the resin of the clear aqueous ink increases, the gloss difference by printing with the clear ink increases when Examples 4 and 6 where the proportion of the resin of the clear aqueous ink was 8 or greater percent by mass is compared with Example 3 where the proportion of the resin of the clear aqueous ink was less than 8 percent by mass.

Also, it was found that the gloss significantly changes in Example 5 where the proportion of the surfactant was two or less percent by mass in comparison with Example 4 where the proportion of the surfactant surpassed 2 percent by mass in the low gloss printing mode.

When Examples 8 where the clear ink was applied onto the magenta ink film was compared with Comparative Example 3 where the magenta ink was singly applied, it was found that the degree of gloss decreased in the low gloss printing mode and increased in the high gloss printing mode.

Example 10

Evaluation on Blocking
Inkjet Printing for Evaluation on Blocking

An inkjet printing device that prints on a wide roll medium and reels it from one roll to another was used for evaluation on blocking. The inkjet printer (ProL4130, manufactured by Ricoh Co., Ltd.) was used as the printing device. The inkjet printer was filled with the clear aqueous ink A of Manufacturing Example 1 and used for evaluation on printing. Synthetic paper VJFN160 (white polypropylene film, gloss 16 (60 degree gloss value, manufactured by Yupo Corporation) was used as the recording medium.

The temperature of the recording medium was controlled by the heating device installed onto an inkjet printer (Pro L4130, manufactured by Ricoh Co., Ltd.). The recording medium was heated at four positions by a pre-heating unit where the recording medium was heated from below before printing, a print-heating unit where the recording medium was heated from below during printing, a post-heating unit where the recording medium was heated from below after printing, and a fan heater that sent heated wind to the recording medium from above after printing. The heating temperatures of the pre-heating, print heating, post-heating, and fan heating were respectively set to 40 degrees C., 40 degrees C., 60 degrees C. and 60 degrees C.

The temperature of the recording medium during printing was measured by a digital radiation temperature sensor (FT-H10, manufactured by KEYENCE CORPORATION). The temperatures of the recording medium were 40 degrees C., 40 degrees C., and 59 degrees C. at the pre-heating, print heating, and post-heating, respectively.

Evaluation on Blocking

The printed image was: solid image; image resolution of 1,200 dpi×1,200 dpi; and printing ratio of 100 percent. After printing, the data printing image of the reeling part of the inkjet printer (Pro L4130, manufactured by Ricoh Co. Ltd.) was reeled and the recording medium was reeled onto the outside of the printed image corresponding to 10 rounds of the roll and allowed to rest for 12 hours. After the resting, the image that had been reeled was back to the original position to check whether the printed image had defects such as strike-thorough. The image defects were graded for evaluation. Grade 5 was best and grade 1 was worst. Grade 3 or above are practically allowable.

The evaluation for blocking was made for a solid image with an image resolution of 1,200 dpi×1,200 dpi with a printing ratio of 100 percent by changing the number of layers from a single, double, to triple. The results are shown in Table 4.

Example 11

The printed product of Example 11 was obtained in the same manner as in Example 10 except that the clear aqueous ink A of Manufacturing Example 1 was changed to the clear aqueous ink F of Manufacturing Example 6 and subject to evaluation for blocking. The results are shown in Table 4.

Example 12

The printed product of Example 12 was obtained in the same manner as in Example 10 except that the clear aqueous ink A of Manufacturing Example 1 was changed to the clear aqueous ink G of Manufacturing Example 7 and subject to evaluation for blocking. The results are shown in Table 4.

Example 13

The printed product of Example 13 was obtained in the same manner as in Example 10 except that the clear aqueous ink A of Manufacturing Example 1 was changed to the clear aqueous ink H of Manufacturing Example 8 and subject to evaluation for blocking. The results are shown in Table 4.

Comparative Example 5

The printed product of Comparative Example 10 was obtained in the same manner as in Example 10 except that the clear aqueous ink A of Manufacturing Example 1 was changed to the clear aqueous ink I of Manufacturing Example 9 and subject to evaluation for blocking. The results are shown in Table 4.

TABLE 4

|  |  | Evaluation on blocking | | |
| --- | --- | --- | --- | --- |
|  |  | Single layer printing | Double layer printing | Triple layer printing |
| Example 10 | Clear aqueous ink A | 5 | 5 | 3 |
| Example 11 | Clear aqueous ink F | 5 | 5 | 4 |
| Example 12 | Clear aqueous ink G | 5 | 5 | 4 |
| Example 13 | Clear aqueous ink H | 5 | 5 | 5 |
| Comparative Example 5 | Clear aqueous ink I | 5 | 3 | 1 |

As seen in the results shown in Table 4, in comparison with Examples 10 to 13 and Comparative Example 5, blocking worsened in Comparative Example 5 where the clear aqueous ink contained no compound represented by Chemical Formula 1 when the ink present in the printed product increased, i.e., the number of layers increased. Conversely, blocking did not worsen in EXAMPLES 10 to 13 where the clear aqueous ink contained the compound represented by Chemical Formula 1 when the ink present in the printed product increased, i.e., the number of layers increased and it was found that good blocking resistance was obtained.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An inkjet printing device comprising:
an ink containing unit configured to contain a clear aqueous ink comprising a resin, a compound represented by Chemical formula 1, and water

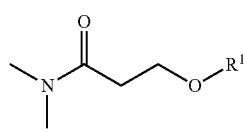

Chemical formula 1 where $R^1$ represents an alkyl group having 1 to 4 carbon atoms;
a discharging head configured to discharge the clear aqueous ink to attach the clear aqueous ink to printed matter to form a clear ink layer thereon with low gloss in a low gloss printing mode or high gloss in a high gloss printing mode; and
a heating device configured to heat the printed matter, in the low gloss printing mode the heating device has a temperature of at least 65° C. and in the high gloss printing mode the heating device has a temperature of no more than 60° C.;
wherein the heating device heats the printed matter satisfying the following relationship 1:

$$Tlgloss > Thgloss \qquad 1,$$

where Tlgloss represents a temperature of the printed matter at a low gloss printing region where the clear aqueous ink is attached in the low gloss printing mode when the clear aqueous ink is attached to the printed matter and Thgloss represents a temperature of the printed matter at a high gloss printing region where the clear aqueous ink is attached in the high gloss printing mode when the clear aqueous ink is attached to the printed matter.

2. The inkjet printing device according to claim 1, wherein the compound represented by Chemical formula 1 has a proportion of 4 or greater percent by mass of the clear aqueous ink.

3. The inkjet printing device according to claim 1, wherein Tlgloss−Thgloss≥10 degrees C.

4. The inkjet printing device according to claim 1, wherein the following relationship 3 is satisfied:

$$Glgloss > Ghgloss \qquad 3,$$

where Glgloss represent a gloss of the printed matter in the low gloss printing mode and Ghgloss represents a gloss of the printed matter in the high gloss printing mode.

5. The inkjet printing device according to claim 1, wherein the resin has a proportion of eight or greater percent by mass of the clear aqueous ink.

6. The inkjet printing device according to claim 1, wherein the resin comprises a polyurethane resin.

7. The inkjet printing device according to claim 1, wherein the clear aqueous ink further comprises a surfactant having a proportion of two or less percent by mass of the clear aqueous ink.

8. The inkjet printing device according to claim 1, further comprising a color ink comprising a resin, a coloring material, and water.

9. The inkjet printing device according to claim 8, wherein the resin in the color ink comprises a polyurethane resin.

10. An inkjet printing device comprising:
an ink containing unit configured to contain a clear aqueous ink comprising a resin, a compound represented by Chemical formula 1, and water

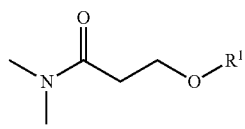

Chemical formula 1 where $R^1$ represents an alkyl group having 1 to 4 carbon atoms;
a discharging head configured to discharge the clear aqueous ink to attach the clear aqueous ink to printed matter to form a clear ink layer thereon with low gloss in a low gloss printing mode or high gloss in a high gloss printing mode; and a heating device configured to heat the printed matter, in the low gloss printing mode the heating device has a temperature of at least 65° C. and in the high gloss printing mode the heating device has a temperature of no more than 60° C.;

wherein the heating device heats the printed matter satisfying the following relationship 2:

$$HTlgloss > HThgloss \qquad 2$$

where HTlgloss represents a temperature of the heating device in the low gloss printing mode and HThgloss represents a temperature of the heating device in the high gloss printing mode.

11. The inkjet printing device according to claim 10, wherein the compound represented by Chemical formula 1 has a proportion of 4 or greater percent by mass of the clear aqueous ink.

12. The inkjet printing device according to claim 10, wherein the following relationship 3 is satisfied:

$$Glgloss > Ghgloss \qquad 3,$$

where Glgloss represent a gloss of the printed matter in the low gloss printing mode and Ghgloss represents a gloss of the printed matter in the high gloss printing mode.

13. The inkjet printing device according to claim 10, wherein the resin has a proportion of eight or greater percent by mass of the clear aqueous ink.

14. The inkjet printing device according to claim 10, wherein the resin comprises a polyurethane resin.

15. The inkjet printing device according to claim 10, wherein the clear aqueous ink further comprises a surfactant having a proportion of two or less percent by mass of the clear aqueous ink.

16. The inkjet printing device according to claim 10, further comprising a color ink comprising a resin, a coloring material, and water.

17. The inkjet printing device according to claim 16, wherein the resin in the color ink comprises a poly urethane resin.

18. An inkjet printing method comprising:

discharging a clear aqueous ink comprising a resin, a compound represented by Chemical formula 1, and water to attach the clear aqueous ink to printed matter to form a clear aqueous ink layer thereon with low gloss in a low gloss printing mode or high gloss in a high gloss printing mode;

Chemical Formula 1

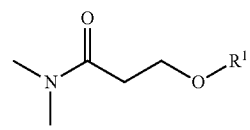

where $R^1$ represents an alkyl group having 1 to 4 carbon atoms; and heating the printed matter, wherein, in the heating, the printed matter is heated satisfying the following relationship 1:

$$Tlgloss > Thgloss \qquad 1,$$

where Tlgloss represents a temperature of the printed matter at a low gloss printing region inhere the clear aqueous ink is printed in the low gloss printing mode when the clear aqueous ink is attached to the printed matter and Thgloss represents a temperature of the printed matter at a high gloss printing region where the clear aqueous ink is printed in the high gloss printing mode when the clear aqueous ink is attached to the printed matter, wherein in the low gloss printing mode the printed matter has a temperature in a range of 50-80° C. and in the high gloss printing mode the heating device has a temperature in a range of 60° C. or less.

* * * * *